A. TOMKINS.
APPARATUS FOR ARRESTING FUMES.
APPLICATION FILED NOV. 10, 1911.
1,057,783.
Patented Apr. 1, 1913.
3 SHEETS—SHEET 1.
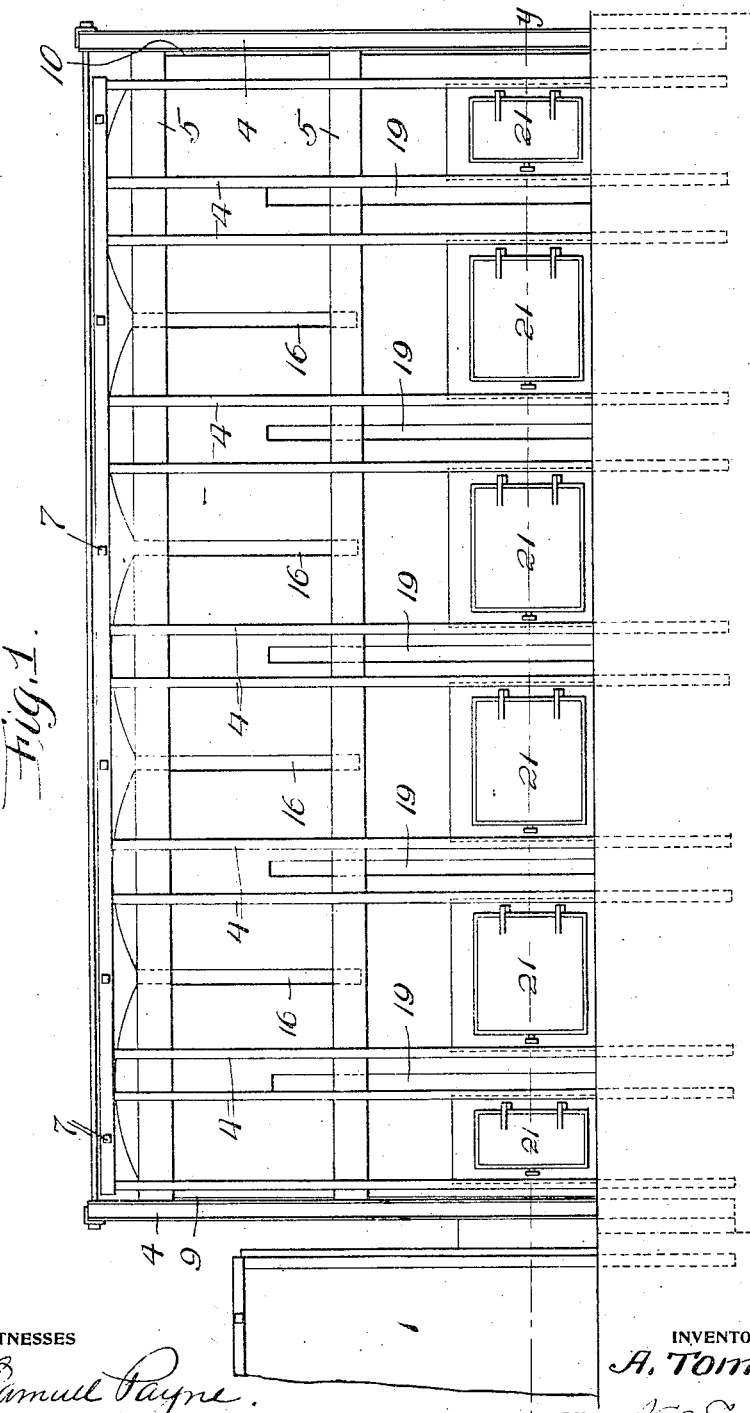
WITNESSES
Samuel Payne.
Ralph C. Evert.
INVENTOR
A. Tomkins.
BY
ATTORNEYS A. TOMKINS.
APPARATUS FOR ARRESTING FUMES.
APPLICATION FILED NOV. 10, 1911.
1,057,783.
Patented Apr. 1, 1913.
3 SHEETS—SHEET 2.
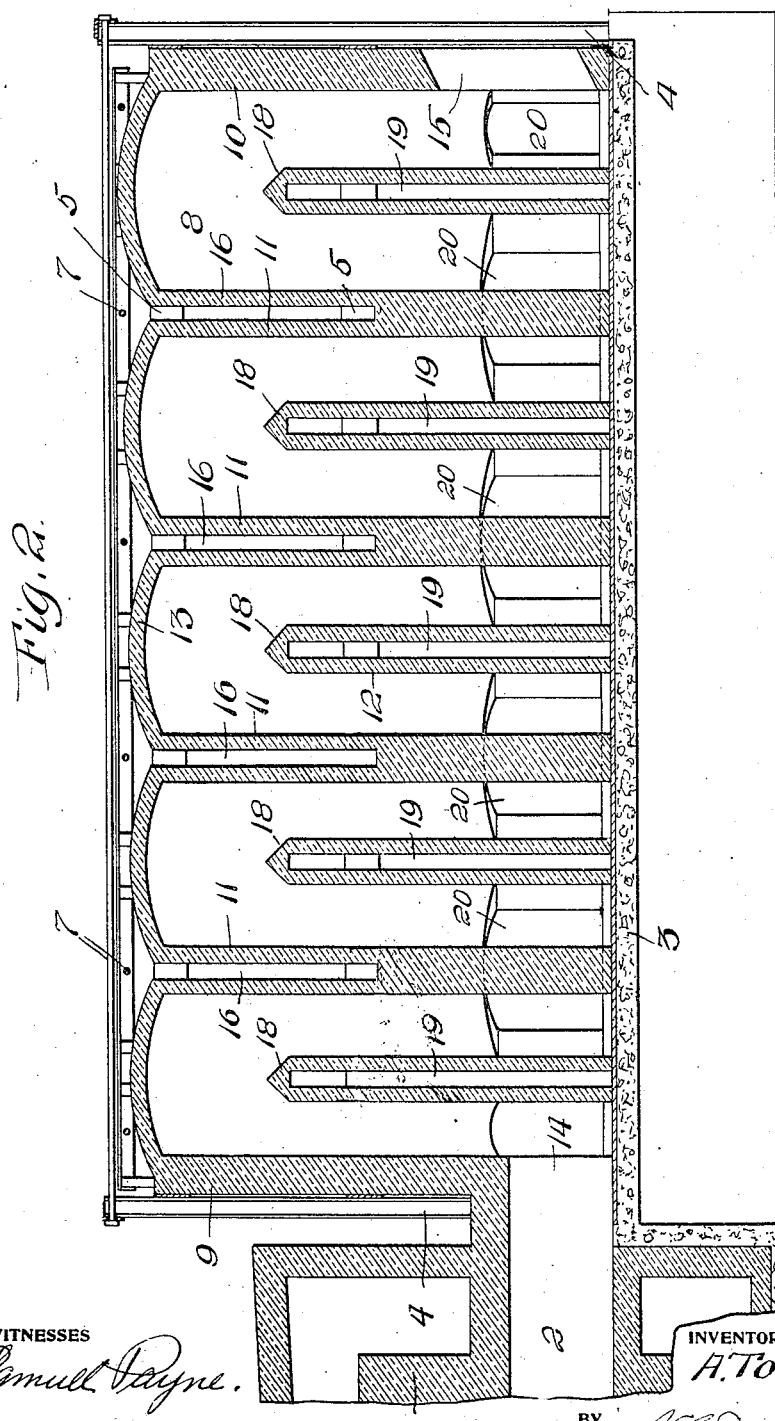
WITNESSES
Samuel Payne.
Ralph C. Evert.
INVENTOR
A. Tomkins.
BY
ATTORNEYS A. TOMKINS.
APPARATUS FOR ARRESTING FUMES.
APPLICATION FILED NOV. 10, 1911.
1,057,783.
Patented Apr. 1, 1913.
3 SHEETS—SHEET 3.
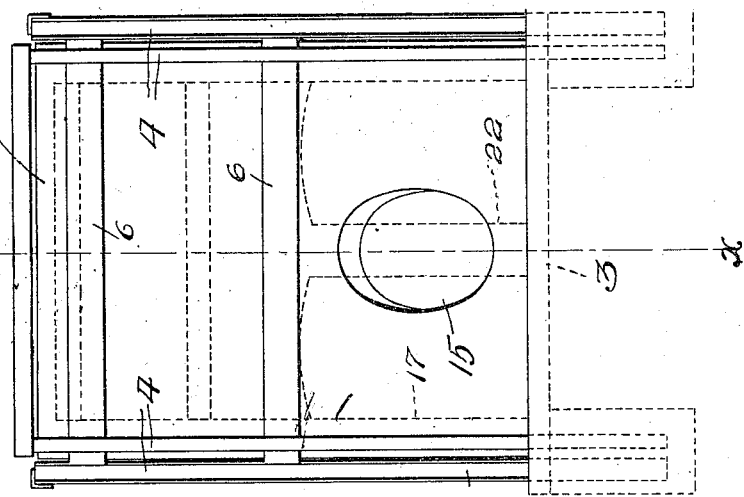
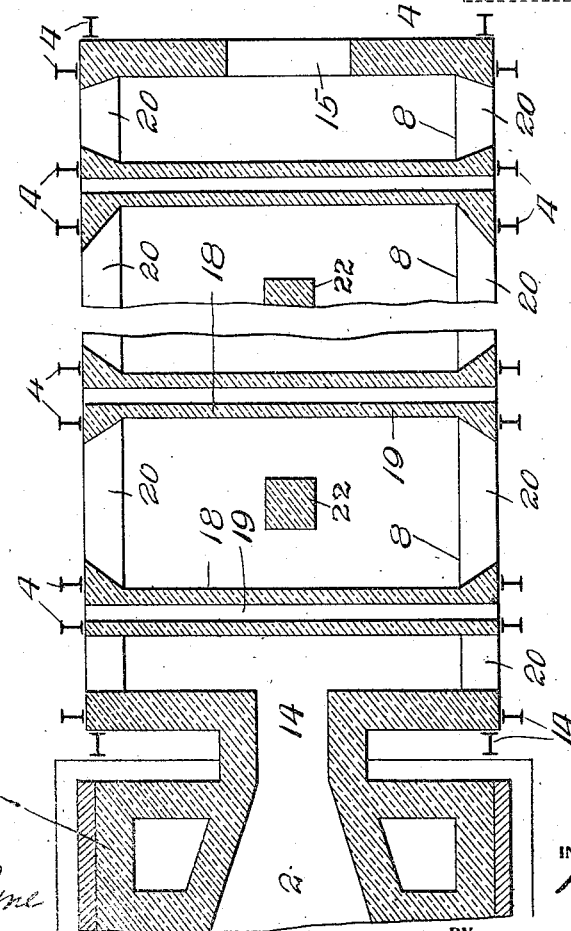
WITNESSES
INVENTOR
A. Tomkins
BY
ATTORNEYS

UNITED STATES PATENT OFFICE.

ALFRED TOMKINS, OF PITTSBURGH, PENNSYLVANIA.

APPARATUS FOR ARRESTING FUMES.

1,057,783.  Specification of Letters Patent.  Patented Apr. 1, 1913.

Application filed November 10, 1911. Serial No. 659,630.

*To all whom it may concern:*

Be it known that I, ALFRED TOMKINS, a citizen of the United States of America, residing at Pittsburgh, in the county of Allegheny and State of Pennsylvania, have invented certain new and useful Improvements in Apparatus for Arresting Fumes, of which the following is a specification, reference being had therein to the accompanying drawing.

This invention relates to an apparatus for arresting fumes and has for its object to provide an apparatus that can be used in connection with metallurgical, reverberatory and regenerative furnaces for collecting solid matter from the exhaust gases or fumes of said furnaces.

A further object of the invention is to provide an apparatus embodying cooled baffles that are disposed in a manner as to provide a sinuous or circuitous passage for gases or fumes, whereby the metallic particles contained within the gases or fumes will be deposited upon the baffles and collected at points that permit their ready removal.

Another object of the invention is to provide an apparatus for saving precious metals held in suspension by gases and fumes, and the invention further aims to accomplish the above results by a method and apparatus that will be hereinafter specifically described and then claimed, and reference will now be had to the drawing, wherein like numerals of reference denote corresponding parts throughout the several views, in which:—

Figure 1 is a side elevation of an apparatus in accordance with this invention. Fig. 2 is a vertical longitudinal sectional view of the same taken on the line X—X Fig. 4. Fig. 3 is a horizontal sectional view of a portion of the apparatus taken on the line Y—Y Fig. 1, and Fig. 4 is an end view of the apparatus.

The reference numeral 1 denotes a portion of a metallurgical furnace, as a detinning furnace, said furnace having an exhaust flue or outlet 2. In communication with this flue or outlet is the apparatus which I employ for carrying my method into effect. The apparatus is preferably located upon a suitable foundation, as a concrete base 3 and comprises an outer frame work or structure made of structural steel and consisting of vertical I-beams 4, longitudinal channel bars 5, transverse end channel bars 6 and longitudinal and transverse tie rods 7. This outer structure forms a frame for bracing the walls of the apparatus and said apparatus is made of a refractory or infusible material, as fire brick.

The structure contained within the outer frame work comprises longitudinal walls 8, end walls 9 and 10, transverse walls or partitions 11, baffle walls 12 and an arched or crenelated roof 13.

The end wall 9 has an opening 14 at the bottom thereof in communication with the flue or outlet 2, and the end wall 10 has the bottom thereof provided with an exhaust opening 15 that can communicate with a stack, chimney or other structure (not shown).

The transverse walls or partitions 11 extend the entire height of the apparatus, are equally spaced throughout the structure and approximately the upper half of each wall is provided with a transverse air passage 16, extending from one side wall 8 to the other side wall 8. These air passages permit of air passing through the walls or partitions 11 for cooling the same. The lower half of each wall or partition 11 is provided with large ports or doorways 17, preferably two in number, as best shown in Fig. 4, said ports being separated by a column 22.

The baffle walls 12 are equally spaced between the transverse walls or partitions 11, said baffle wall extending from the bottom of the structure to a point in proximity to the roof of said structure and terminating at a point above the large ports or doorways 17. The walls have the upper end thereof beveled, as at 18 to provide deflectors, and said walls are provided with transverse air passages 19. The passages 19 extend from one of the walls 8 to the other and from the bottom of the structure to a point in close proximity to the top of said walls. The air passages 19 serve the same purpose as the passages 16,—that of cooling.

The side walls 8 are provided at the bottom thereof with doorways 20 normally closed by hinged doors 21, these doorways permitting of easy access being had to the interior of the structure for removing dust or other matter.

Before setting forth the method involved in connection with my apparatus, I desire to make several structural reservations. First, that of using any cooling agent for the structure, particularly in connection with the walls 11 and 12. In lieu of air, provision can be made for circulating water in the walls, or a refrigeratory plant or agent can be installed whereby said walls can be maintained in a cool state conducive to a rapid reduction or separation of metallic particles from gases. Second, that of making the structure any desired length, whereby the alternately arranged walls will present a tortuous or circuitous path of a desired length for gases, thereby insuring a thorough scrubbing or separation of particles held in suspension from those that are lighter than air. Third, the use of the apparatus in connection with an open hearth or regenerative furnace, where checkerwork is employed for cooling purposes, it being a well known fact that the checkerwork is often clogged by dust or other matter carried into the furnace by the fuel gas or air. In connection with this type of furnace the apparatus can be located adjacent to the checkerwork to baffle and retard solid matter prior to the gas or air passing through the checkerwork.

The apparatus thus described includes a structure that presents a tortuous or circuitous path or passage for gases and fumes, and as the gases are emitted or ejected from the outlet or flue 2, they encounter the first baffle wall 12 and must pass upwardly over this wall where they encounter the first transverse partition 11. It is then necessary for the gases to pass downwardly through the large ports or doorways 17 that are separated by the wall supporting columns 22, the gases passing through the ports to encounter another baffle wall and so on until the gases finally escape through the exhaust opening 15. In causing the gases to travel in a circuitous manner against the baffles, metallic particles are retarded, deposited upon the baffles or precipitated to the bottom of the baffles, where from time to time the metallic particles can be removed through the doorways 20.

The method and apparatus has been especially designed for a detinning furnace, wherein scrap tin is burned, forming white tin oxid ($SnO_2$) that can be collected in the apparatus. Another treatment of scrap tin is that of resorting to the use of chlorin or some other active dissolving chemical that removes the tin from the plate, the tin being carried off as a gas into the apparatus, where the tin collects as a scum or scruff upon the baffles.

While in the drawings there is illustrated the preferred form of apparatus by which I carry my method of detinning or collecting dust into effect, it is to be understood that the structural elements of this apparatus are susceptible to such variations as fall within the scope of the appended claims.

What I claim is:—

1. An apparatus of the type described comprising a structure having the ends thereof provided with openings, transverse walls within said structure and having the upper portions thereof provided with air passages extending from one wall of said structure to the opposite wall, said transverse walls having the lower ends thereof provided with ports, transverse baffles arranged between said walls and extending to a point above the ports of said transverse walls, said baffles having air passages formed therein extending from one wall of said structure to the opposite wall, and one of the walls of said structure having doorways formed therein.

2. An apparatus for arresting fumes comprising a rectangular structure having openings in the end walls thereof, transverse walls within said structure and extending from one side wall to the other and from the bottom to the top of said structure, said transverse walls having air passages in the upper portions thereof, said air passages opening into the atmosphere at the top and sides of said structure, said transverse walls having ports in the lower portions thereof, transverse baffles arranged between said transverse walls and of a height as to extend from the bottom of the structure to a point above said ports, said baffles having air passages opening into the atmosphere at the sides of said structure, and said structure further provided with doorways in one side thereof.

3. An apparatus for arresting fumes comprising a structure having each of its ends formed with an opening and one side with doorways, transverse walls connected with the sides of said structure and having air passages in the upper portions thereof, said air passages opening into the atmosphere at the sides of said structure, said transverse walls having circular ports in proximity to their lower termini, transverse baffles arranged between the sides of said structure and extending from the bottom of the structure, said baffles interposed between said transverse walls and of a height to extend above said ports, said baffles having the air passages formed therein and opening into the atmosphere at the sides of said structure.

4. An apparatus for arresting fumes comprising a rectangular structure formed with spaced transverse walls having air passages in the upper portions thereof, said air passages opening at their ends into the atmosphere at the sides of said structure, said transverse walls having centrally disposed ports in their lower portions and below the air passages, and baffles interposed between said transverse walls and of a height as to extend above said ports and having air passages with their ends opening into the atmosphere at the sides of said structure.

5. An apparatus for arresting fumes comprising a structure including side and end walls, a top and a bottom, transverse walls having their ends terminating in said side walls and extending from said bottom to said top, said transverse walls having air passages in their upper portions, said air passages opening through said top and sides into the atmosphere, said transverse walls further provided below said passages with ports, and baffles positioned between said transverse walls, mounted upon said bottom and extending above said ports, said baffles extending from one side to the other side of said structure and having air passages opening through said side walls into the atmosphere, each of said end walls having an opening, and one of said side walls provided with doorways.

6. An apparatus for arresting fumes comprising a structure formed with spaced partitioned walls having air passages in the upper portions thereof, said air passages opening into the atmosphere at the sides and top of said structure, the partitioned walls having ports in their lower portions and below said air passages, and baffles interposed between said partitioned walls of a height as to extend above said ports and having air passages with their ends opening into the atmosphere at the sides of said structure.

In testimony whereof I affix my signature in the presence of two witnesses.

ALFRED TOMKINS.

Witnesses:
   Jno. M. Irwin,
   E. J. House.